July 8, 1930.   M. FITZGERALD   1,770,372
MILK PAIL HOLDER
Filed Feb. 2, 1929
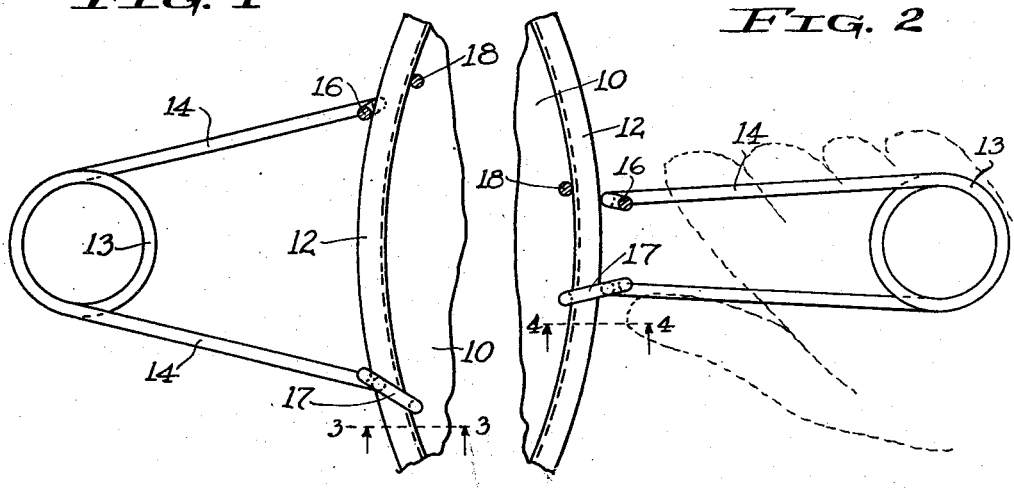
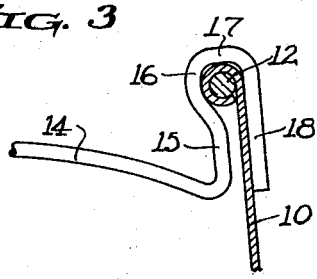
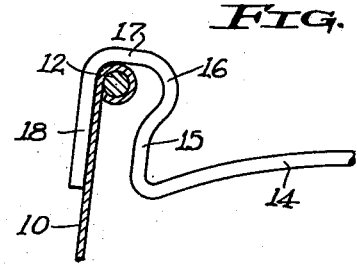
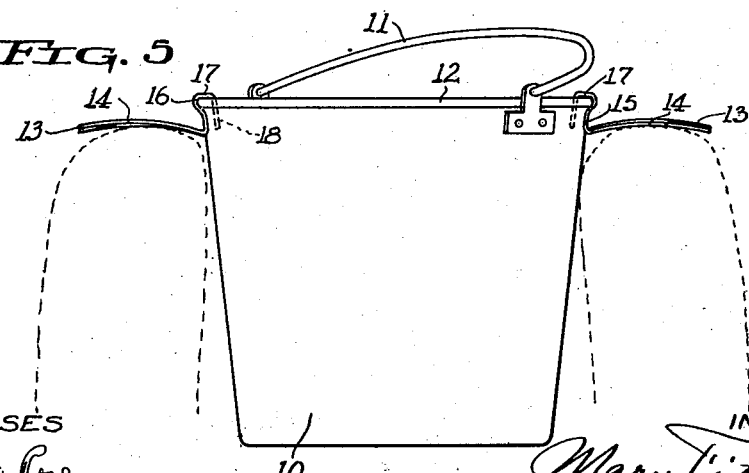

Patented July 8, 1930

1,770,372

UNITED STATES PATENT OFFICE

MARY FITZGERALD, OF KILBOURN, WISCONSIN

MILK-PAIL HOLDER

Application filed February 2, 1929. Serial No. 336,978.

This invention relates to milk pail holders and has for its object to provide such a holder that may be quickly detachable and as quickly placed in position for use.

Another object of the invention is to provide such a holding attachment for milk pails that will be suitable for use with any milk pail and when attached will be firmly and rigidly held in place and constitute a convenient support for the pail by resting on the knees of the milker.

Another object of the invention is to provide such a holding attachment for milk pails that can be inexpensively manufactured of spring wire and that will form a locking engagement with the bead or rim of the pail and will be readily attached or detached when spring spread engaging ends are pressed together but incapable of disconnection while spread apart by the action of the spring.

With the above and other objects in view the invention consists of the milk pail holder as herein claimed and all equivalents.

Referring to the accompanying drawings, in which like characters of reference indicate the same parts in different views, Fig. 1 is a plan view of one of the milk pail holders of this invention applied to the rim of a pail, a part thereof being sectioned;

Fig. 2 is a similar view thereof with the holder compressed by a hand, shown in dotted lines, as in attaching or detaching it;

Fig. 3 is a sectional view on the plane of line 3—3 of Fig. 1;

Fig. 4 is a sectional view on the line 4—4 of Fig. 2, and

Fig. 5 is a view showing a milk pail supported by the holders of this invention resting on the knees of the milker, shown in dotted lines.

In these drawings, 10 indicates an ordinary milk pail with a bail handle 11 and a roll bead 12. The pail holders of this invention consist of spring clips, which are preferably formed of spring wire coiled to form a helical spring 13 with its ends extending therefrom at an angle to each other to form divergent spring arms 14, which curve downwardly as shown. These ends are bent upwardly to form upstanding portions 15 and then curve rearwardly or outwardly from the center of the pail at 16 and then extend forwardly again at 17 in somewhat the same direction as on leaving the coiled spring 13, but preferably at an increased angle with respect to each other so as to have greater divergence, for a reason which will be later apparent, and finally they extend downwardly to form portions 18 adapted to engage within the pail.

In the normal condition of the spring clip when unattached to the pail, the spread of the arms 14 is to an angle of approximately 45°, at which angle the hook-like ends 15, 16, 17, 18, are so divergent as to be incapable of passing over the rim of the pail. By pressing the spring arms 14 together, however, to a position in which they are parallel or approximately so, these hook-like ends may be readily passed over the rim of the pail, the distance between the upright portions 15 and the downwardly extending portions 18 being ample for that purpose, as shown in Fig. 4. Then upon releasing the arms 14 the spring 13 spreads them apart as far as will be permitted by the engagement of the hooks with the pail rim, as shown in Fig. 1. In this position their divergence is such that the shoulders formed at the junction of the upright portions 15 with the curves or loops 16 form engaging shoulders clamping the pail beneath the bead 12 to make it impossible for the spring clip or holder to become detached from the pail. In the attached position the arms 14 have less than their full divergence and consequently they are urged apart with spring action and their engagement is a clamping engagement that firmly and rigidly secures the holder in place incapable of being accidentally stripped from the edge of the pail.

In use holders of this type are attached to the rim of the pail at opposite edges thereof and form projections from the pail to rest upon the knees of the milker, who therefore does not have to support the pail by the pressure of the knees against it. The weight of the contents of the pail, or even a blow on the pail, will not dislodge the holders, but they may be readily disconnected when desired by merely pressing the arms 14 together until the hooks on their ends are free to release the rim of the pail, as in Fig. 2, whereupon it may be lifted off for cleaning as readily as it was attached. The greater divergence of the hook portions than of the arms themselves accentuates the gripping shoulder characteristics of the upright portions 15 for clamping engagement beneath the rim of the pail, while the downwardly extending ends 18 engaging the inside of the pail co-operate with said upright portions 15 to effect this clamping engagement as the R-shaped hook members spring to their greater angular relation to each other.

The readily removable pail-holders of this invention have the advantage over a permanently attached holding means in that they permit of cleaning and nesting of pails in the usual way. They remain firmly in place on the pail during milking, as well as when emptying the pails, and are readily detached and hung out of the way until the pail is again used for milking.

What I claim as new and desire to secure by Letters Patent is:

1. A pail holder comprising a pair of divergent arms urged apart by spring action, hooks formed on their ends capable of freely engaging the edge of the pail when the arms are pressed together but caused to clamp the edge of the pail in the position of greater divergence resulting from the spring action.

2. A pail holder comprising a pair of arms urged apart by spring action, hooks on their ends for freely passing over the beaded rim of a pail when said arms are pressed together against the spring action, said hooks having enlargements to receive the bead of the pail rim when the arms are released and are urged apart by the spring into clamping engagement with the pail rim.

3. A pail holder comprising a spring wire bent to form a coiled spring at its middle and having its ends diverge from the coiled spring to form curved arms normally spread apart, upwardly extending portions on the arms having bent portions at their upper ends with downwardly extending end portions to engage the inner surface of the pail rim, said upwardly extending portions being so positioned with respect to the downwardly extending portions as to freely permit the entrance of the rim bead between them when the arms are pressed together but preventing the passage of the bead therefrom when the arms are spread apart by the spring action.

In testimony whereof I affix my signature.

MARY FITZGERALD.